United States Patent [19]

Feinbloom

[11] Patent Number: 4,662,733
[45] Date of Patent: May 5, 1987

[54] METHODS AND APPARATUS FOR MEDICAL PHOTOGRAPHY

[75] Inventor: Richard E. Feinbloom, New York, N.Y.

[73] Assignee: Designs for Vision, Inc., Ronkonkoma, N.Y.

[21] Appl. No.: 752,068

[22] Filed: Jul. 5, 1985

[51] Int. Cl.⁴ .............................................. G03B 15/02
[52] U.S. Cl. ..................................................... 354/126
[58] Field of Search ........................ 362/3, 16, 17, 18; 354/62, 126, 145.1, 149

[56] References Cited

U.S. PATENT DOCUMENTS

| | | | |
|---|---|---|---|
| 2,789,205 | 4/1957 | Schwartz | 362/3 X |
| 2,990,765 | 7/1961 | Winzenburg | 354/62 |
| 3,127,112 | 3/1964 | McCammon et al. | 362/17 |
| 4,085,316 | 4/1978 | Quinn | 362/16 |
| 4,217,045 | 8/1980 | Ziskind | 354/126 X |
| 4,251,854 | 2/1981 | Kaneko et al. | 354/149.1 X |
| 4,293,892 | 10/1981 | Plummer | 362/18 X |

OTHER PUBLICATIONS

American Photography, vol. 44, No. 7, Jul. 1950, pp. 21 to 23.
Dental Radiography and Photography, vol. 31, No. 3, 1958.

*Primary Examiner*—Donald A. Griffin
*Attorney, Agent, or Firm*—Arthur L. Plevy

[57] ABSTRACT

This invention provides a method of obtaining increased efficiency in implementing a medical photograph by allowing the practitioner to utilize a slower speed film which has a high response to the color red and hues thereof. According to the techniques depicted herein, a flash or beam of light which is generated by means of an ignition tube or a flash bulb is directed through a condensing lens which lens directs the beam of light in a concentrated area thus allowing the practitioner to obtain a greater depth of focus with a higher f-stop. This thereby enables one to utilize a slower speed film which film inherently possesses a better response to the color red.

6 Claims, 6 Drawing Figures

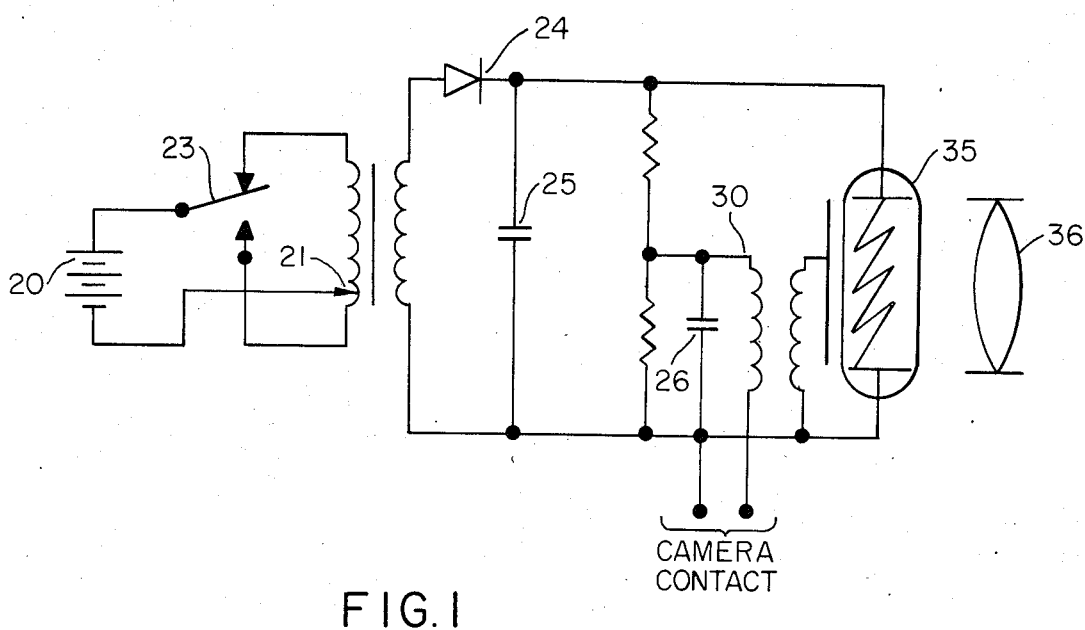
FIG. 1
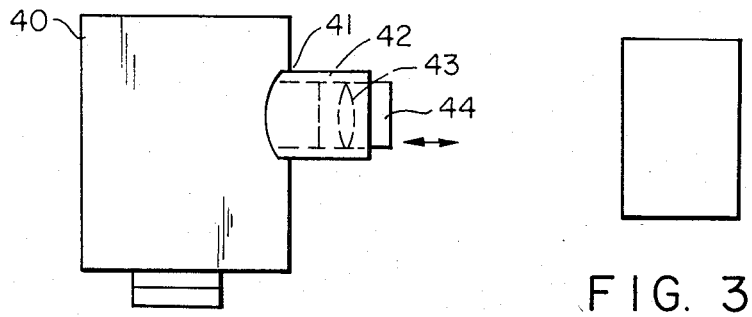
FIG. 2
FIG. 3
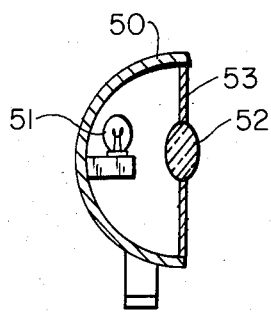
FIG. 4
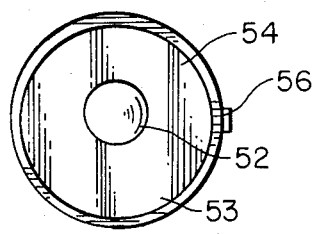
FIG. 5

METHODS AND APPARATUS FOR MEDICAL PHOTOGRAPHY

BACKGROUND OF THE INVENTION

This invention relates to apparatus for medical photography and more particularly to a method for obtaining an intense beam of light in a concentrated area for use in the medical photography field.

Medical photographs are widely employed and used in teaching as well as for the presentation of various data to other practitioners. A great many such photographs are taken in the operating room by a surgeon during the course of an operation. Such photographs are made by employing conventional photographic techniques utilizing a camera with flash bulbs, flash guns and so on.

Most available flash guns as well as electronic flashes employ the well known Fresnel lens or another type of deflector which essentially operates to spread the flash or beam over a wide area. The basic concept in photography is to illuminate as much an area as possible by means of a flash or a flash gun in order to obtain a wide field of view to enable one to take a picture of a large area. Such techniques as using conventional flash bulbs and flash guns has resulted in problems in the field of medical photography. In medical photography the color red and the fidelity of portraying the color red is a substantial problem.

As is known, red is the color of blood, various vessels as well as a predominate color of the organs and other internal body parts. Hence it is a basic objective in the field of medical photography to present the color red and its various hues as true as possible. The response of various films to the color red varies greatly. For example, slower films have a much better response to the color red then higher speed films. A very popular type of film is sold under the trademark Kodachrome by the Kodak Company of Rochester, N.Y. This type of film is a relatively slow film but has an excellent response to the color red. A higher speed film which is a more sensitive film is sold under the trademark Ektachrome by the same manufacturer.

This film, while faster, has a poorer response regarding the fidelity of the color red. Ektachrome is widely employed due to the fact that the amount of light required to expose the film in the given time period is much less than that required for Kodachrome.

A further problem is compounded by the fact that conventional light or flash attachments for cameras operate to disperse the beam over a wide area and hence require the use of a high speed film due to the spreading of the beam from the flash bulb or flash gun. Hence it is an object of the present invention to obtain an intense beam of light from a conventional flash which beam is directed in a concentrated area and employed for medical photography.

The concept of this invention allows one to obtain a greater depth of focus with a higher f-stop on a camera and thereby enables one to utilize a slower film which has a greater response to the color red.

BRIEF DESCRIPTION OF THE PREFERRED EMBODIMENT

In a method for implementing medical photographs employing a conventional camera having coupled thereto a flash attachment having an activatable light source for providing a light pattern to illuminate an object to be photographed, the improvement therewith comprising the step of placing a condensing lens in front of said light source to obtain an intense beam of light manifesting an illumination pattern for said object in a concentrated area of said object whereby one can employ a slower film for said camera which film exhibits an increased response to the color red and associated hues thereof.

BRIEF DESCRIPTION OF THE FIGURES

FIG. 1 is a schematic view of a typical flash unit employed in this invention.

FIG. 2 is a side view of a flash tube assembly employing a condenser lens according to this invention.

FIG. 3 is a schematic view of a typical rectangular illumination pattern according to this invention.

FIG. 4 is a side sectional view of a flash bulb assembly incorporating a condensing lens according to this invention.

FIG. 5 is a front plan view of the assembly of FIG. 4.

DETAILED DESCRIPTION OF THE FIGURES

Figure 6:
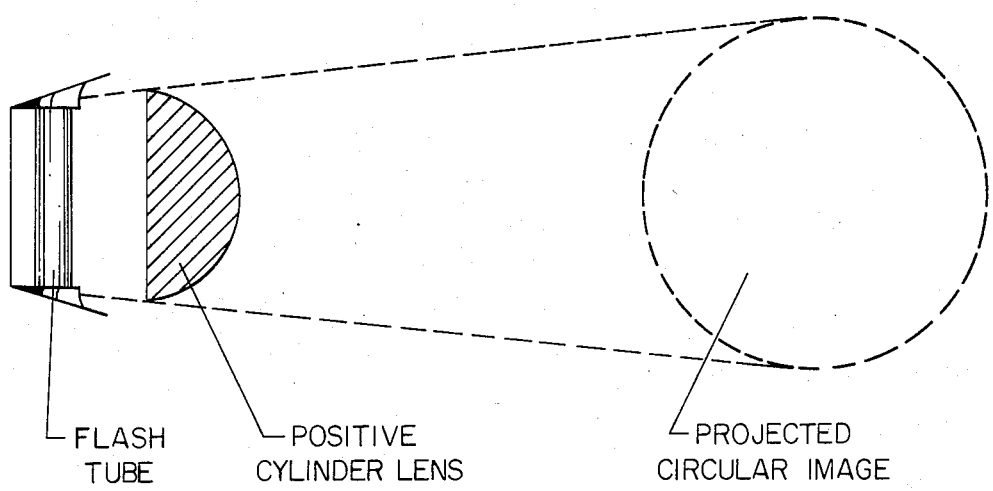
FIG. 6 is a schematic diagram of an alternate embodiment of the invention utilizing a cylindrical lens.

Referring to FIG. 1, there is shown a typical electronic flash of the type which is widely employed in modern equipment.

The operation of the electronic flash is well known, but a brief description of the circuitry employed will be given referring to in FIG. 1. A battery 20 is coupled to the primary winding of a transformer 21 via an electronic chopper circuit 23. A chopper is a well known circuit component which essentially changes the polarity of a DC source by switching the contact between the terminals of the source to produce an AC voltage at the primary winding 21. This voltage is applied to the secondary winding of the transformer where it is rectified by diode 24 and filtered by capacitor 25 to provide a higher voltage.

This high voltage direct current which is stored by capacitor 25 charges an an ignition capacitor 26. The capacitor 26 is coupled across an ignition coil 30 which is a transformer having a secondary winding connected to the electrodes of a flash tube or ignition tube 35. The flash tube and ignition circuitry are normally contained in the flash holder of the camera. The flash tube 35 is filled with an inert gas such as xenon.

As shown in the diagram, one terminal of the capacitor as well as a terminal of the ignition coil are connected to the camera contact. Thus when the camera shutter is released, the synchronizing contact of the shutter causes the capacitor 26 to discharge through the primary winding of the ignition coil 30. As a result of this, a high voltage is induced in the secondary winding. This high voltage is applied between the ignition electrode and the negative electrode of the flash tube and operates to inonize the gas to make it conductive to electricity so that the condenser can discharge itself through the ignition tube 35.

During a period of about one-thousandth of a second, the stored electrical energy flows through the flash tube as a high intensity current and thereby causes the gas to glow brightly.

As indicated, such flash tubes are utilized in a housing which contains a Fresnel lens as the purpose of the lens is to diverge the beam to cover a relatively wide area. As indicated above, this creates greater disadvantages in regard to taking medical photographs. Hence in order to utilize a flash tube or a flash gun, one must eliminate the use of the Fresnel lens or of additional apparatus which serves to diverge the beam from an electronic flash or from a flash bulb.

Hence as shown in FIG. 1, located in front of the ignition tube 35 is a condensing lens 36. The condensing lens operates to concentrate the beam within a given area. Essentially, the condensing lens forms a rectangular light pattern obtaining an intense beam in a small area. This allows the user to obtain a greater depth of focus with his camera while using a higher f-stop. Thus the user can now employ a slower film which has a better response to red. The condensing lens employed may be a conventional 35 millimeter lens, while the pattern produced by the lens is rectangular in shape as for example shown in FIG. 3.

Referring to FIG. 2, a typical housing is shown. In FIG. 2, the housing 40 may contain the entire circuit components as shown in FIG. 1. Many such housings with the circuitry shown in FIG. 1 are available and are widely sold as flash units for various cameras. The housing normally contains an opening 41 which opening has positioned therein a Fresnel lens or another type of lens which will disperse light to cover a large area.

This lens is removed and is replaced with a turret assembly 42 which contains a telescoping arrangment and a condensing lens 43. Essentially, the assembly consists of a first housing 42 which is attached to the flash housing 40 to cover the opening which normally accommodates the Fresnel lens.

The housing 42 has movably secured thereto an inner housing 44 containing the condensing lens 43. In this manner the condensing lens can be moved in and out according to the distance of the object from the camera. Essentially, units such as 40 are commercially available as complete flash units and are adapted to couple to many different types of cameras. There are, of course, many different types of lenses which can be employed to concentrate the beam of light from a flash tube or a flash bulb into a rectangular beam pattern to enable a medical photographer to obtain an intense beam in a concentrated area.

By doing this, one can then utilize a slower film which has a better response to the color red which is predominantly portrayed in most medical photographs.

The condensing lens will take the flash pattern from the flash tube or the flash bulb will convert it into a rectangular pattern. The focal length of the condensing lens is not important as various lenses can be employed to accomplish the same results. Essentially, one can also utilize a cylindrical condensing lens where the axis of the lens will be placed perpendicular to the main axis of the ignition tube 35 or the flash tube. In this manner one would obtain a circular spot instead of a rectangular pattern. The size of the pattern can be changed by changing the focal distance of the lens with respect to the object.

The reason why the pattern is rectangular is because of the fact that the shape of the ignition tube is cylindrical thereby having a rectangular front plan view. One can also employ this invention with a flash bulb as shown in FIG. 4.

FIG. 4 depicts a normal flash assembly which normally includes a reflector 50 which reflector has a flash bulb holder 51 secured to the central portion thereof. The purpose of the reflector is again to disperse the light from the flash bulb to cover a wide area. In regard to this invention, the condenser lens 52 is supported by an annular plate 53. The plate 53 as shown in FIG. 5 is hinged by means of a hinge 56 to the reflector 50. The front surface 54 of the plate 53 is coated or may be fabricated from a non-transparent material with the condensing lens positioned in the center of the plate directly above the flash bulb. In this manner light emitted from the flash bulb will be condensed by the condensing lens to provide an intense beam over a concentrated area. The shape of this beam will be circular in lieu of the rectangular pattern which will be provided by a typical ignition tube.

FIG. 6 shows an embodiment utilizing a cylindrical lens. In regard to FIG. 6, the rectangular light pattern from the flash tube is converted into a circular image of a concentrated area by using a positive cylindrical lens as shown in FIG. 6.

I claim:

1. Apparatus for providing an intense beam of light for medical photography purposes employing a conventional camera, said apparatus comprising flash attachment means for connecting to said conventional camera, said flash attachment means having an activatable light source for providing a predetermined light pattern to illuminate an object to be photographed, said object characterized in having predominate red color tones, condensing lens means coupled to said flash attachment and positioned in front of said activatable light source at a light output of said flash attachment to concentrate emitted light from said flash attachment to a given small area which area is substantially less than the area which would normally be illuminated by said light source; and means for limiting light emitted by said activatable light source to said light output.

2. The apparatus according to claim 1, wherein said activatable light source is an ignition tube.

3. The apparatus according to claim 1, wherein said activatable light source is a flash bulb.

4. The apparatus according to claim 1, wherein said condensing lens means is movably adjustable with respect to said light source.

5. The apparatus according to claim 1, wherein said condensing lens is a cylindrical lens.

6. A method of providing intensified illumination in a concentrated area to enable medical photographs to be obtained with slower speed film exhibiting an increased response to the color red and associated hues thereof to permit bodily fluids, vessels and organs to be photographed with a high degree of color accuracy with conventional camera equipment, said method comprising the steps of concentrating the illumination pattern of a photoflash unit to said concentrated area, said step of concentrating being performed by disposing a condensing lens at the light output of said photoflash unit at a location to concentrate radiation therefrom to said concentrated area and limiting useful exposure radiation from said photoflash unit to said light output, said illumination pattern in said concentrated area being a rectangular pattern.

* * * * *